United States Patent [19]

Evans, III et al.

[11] Patent Number: 5,345,894
[45] Date of Patent: Sep. 13, 1994

[54] ADAPTOR PLATE FOR SHIELDED DROP-LOCK ADJUSTMENT ON AN ANIMAL FEEDER

[75] Inventors: Robert B. Evans, III, Fayetteville, N.C.; Leon S. Zimmerman, Lititz, Pa.

[73] Assignee: Staco, Inc., Schaefferstown, Pa.

[21] Appl. No.: 954,824

[22] Filed: Oct. 1, 1992

Related U.S. Application Data

[63] Continuation-in-part of Ser. No. 891,203, Jun. 1, 1992, Pat. No. 5,222,460.

[51] Int. Cl.⁵ .............................................. A01K 5/00
[52] U.S. Cl. ..................................... 119/53; 74/547
[58] Field of Search ................ 119/53, 53.5, 54, 56.1; 16/110 R, 110.5, 112, DIG. 24; 70/207, 209, 224; 74/545, 547

[56] References Cited

U.S. PATENT DOCUMENTS

| | | | |
|---|---|---|---|
| 1,359,158 | 11/1920 | Dohm | 119/53.5 |
| 1,659,506 | 2/1928 | Wheeler | 74/547 |
| 1,677,064 | 7/1928 | Watt | 74/547 |
| 2,137,457 | 11/1938 | Pattcy | 74/547 |
| 2,165,121 | 7/1939 | Amstutz | 119/53.5 |
| 2,644,425 | 7/1953 | Hazen | 119/53.5 |
| 2,796,848 | 6/1957 | Zimmerman | 119/53 |
| 4,491,087 | 1/1985 | Herring, Sr. | 119/53.5 |
| 4,889,078 | 12/1989 | Smiley | 119/53.5 |
| 5,044,318 | 9/1991 | Sutton et al. | 119/53 |

OTHER PUBLICATIONS

*Modern Ag Systems,* "Stainless Steel Hog Feeders".

*Primary Examiner*—Paul J. Hirsch
*Assistant Examiner*—Todd E. Manahan
*Attorney, Agent, or Firm*—John G. Mills & Associates

[57] ABSTRACT

This invention is a drop-lock adjustment used on automatic feeders to adjust the feed gates either up or down and includes shielded drop locks connected to control rods that pass through a channel. An adaptor plate mounted on the channel has a downwardly projecting flange spaced from the channel with an elongated slot in the plate to prevent the animals being fed from tripping the lock to cause either more or less feed to be dispensed.

4 Claims, 3 Drawing Sheets

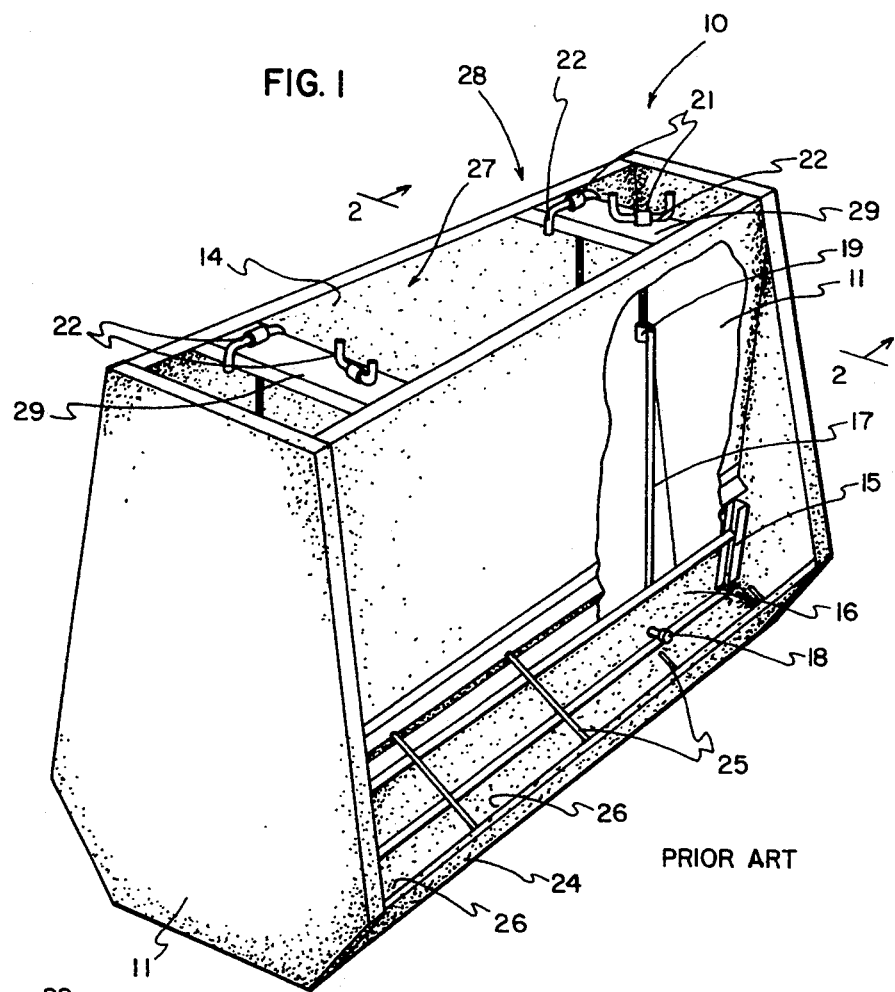
FIG. 1 PRIOR ART
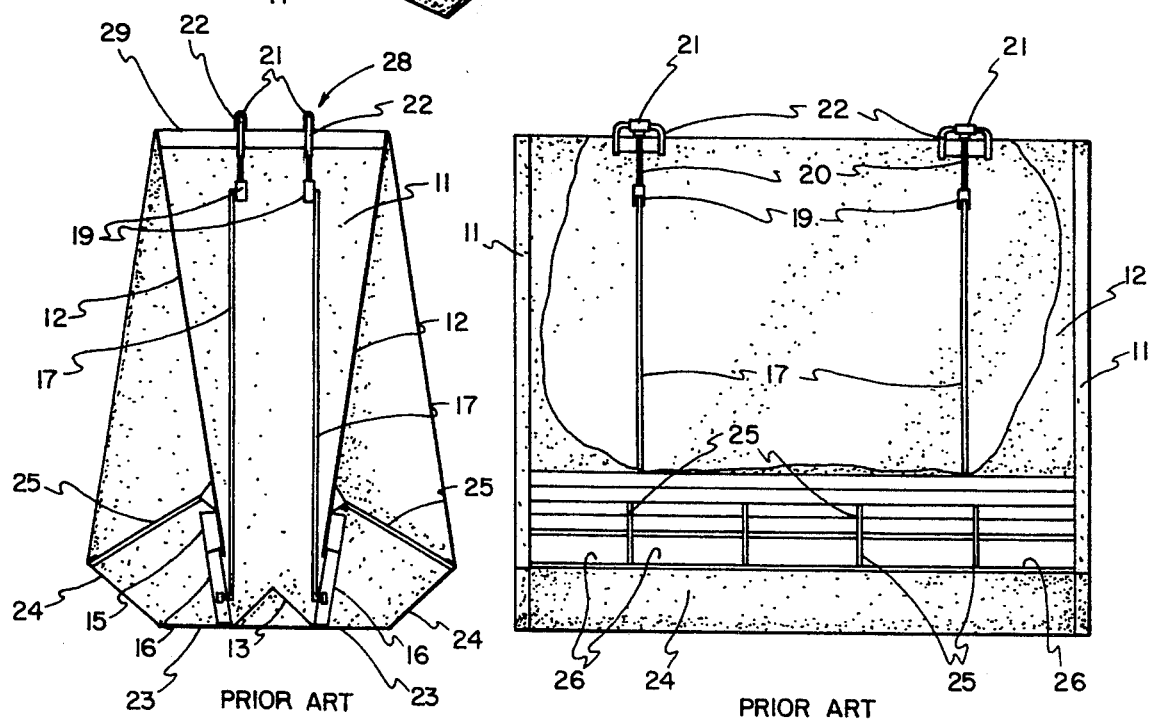
FIG. 2 PRIOR ART
FIG. 3 PRIOR ART

ADAPTOR PLATE FOR SHIELDED DROP-LOCK ADJUSTMENT ON AN ANIMAL FEEDER

CROSS-REFERENCE TO RELATED APPLICATIONS

This is a continuation-in-part of co-pending U.S. application Ser. No. 07/891,203, filed Jun. 1, 1992, now U.S. Pat. No. 5,222,460.

FIELD OF INVENTION

This invention relates to locking handles and more particularly to adjusting means having a shielded drop-lock to prevent inadvertent manipulation thereof.

BACKGROUND OF INVENTION

Automatic feeders have become part of modern automated animal production operations. These feeders cut down on the labor required while at the same time more accurately controlling the amount and disbursement rate of such feeding.

For large animals, such as hogs, stainless steel feeders have been developed which include hoppers that act as a reservoir for the feed and adjustable feed gates which communicate between the interior and exterior of the hopper and control the supply of feed passing therethrough. Threaded adjustment rods with cranks allow the feed flow to be adjusted by cranking the feed gates either up or down. Once the proper position of the feed gate is achieved, the U-shaped crank handles are pivoted downwardly which allow them to drop on either side of a channel bar across the top of the hopper and to engage the same.

So long as the animals do not gain access to the now inverted U-shaped crank handles that lie in engagement with the supporting channel means, the gate feed adjusting means works fine.

With some animals, particularly with hogs which tend to get bored during feeding and look for any type of diversion, they will crawl up on the feeder and quite often will engage the U-shaped crank in its inverted, locked position and will move it upwardly to a point that the same can be rotated. This causes either an increase or decrease in the flow of feed past the feed gate from the hopper to the feeding trough adjacent thereto.

The above is not only undesirable in that it throws off control of the right amount of food for the animals being fed, but also causes the use of the feeders to be more labor intensive because of having to check the feed gates periodically for proper adjustment.

BRIEF DESCRIPTION OF INVENTION

After much research and study into the above mentioned problems, the present invention has been developed to provide a shielded drop-lock adjustment means wherein, when the crank is inverted after use, it will drop into at least one slot-like opening with the normal down turn edges of the channel bar protecting the same. This prevents it from being susceptible to nudging from inverted to upright position. By preventing this unlocking of the handle, animal adjustment of the feed gates is prevented.

On the other hand, the dexterity of the human hand makes it easy for a person to move the crank handles from inverted to upright position for manipulation of the adjusting rods to move the feed gates either up or down as desired.

DISCUSSION OF PRIOR ART

Drop-lock feed gate adjustment means are being produced and used in conjunction with commercial feeders such as Modern Ag Systems stainless steel hog feeders designated as N series, G series, F series and SF series which covers nursery feeders, grower feeders, finisher feeders and super feeders with anywhere from three to seven feed positions per side and includes single sided and double sided feeders. These are manufactured by STACO Inc. of Schaefferstown, Pa.

The crank arms are generally U-shaped in configuration and when in the upright position, the crank arms act as handles to allow easy turning adjustment of the threaded adjustment rods and the feed gates that are operatively associated therewith.

When the crank arms are inverted to the down position, the ends thereof are disposed on opposite sides of the supporting channel bar thus locking the same in position. These inverted, locked crank arms are subject to nudging by the animals being fed, particularly by hogs which move the same up just far enough to clear the edge of the channel bar and to allow the adjusting rods to be rotated. This causes the feeder gates to be moved to a position other than that originally set.

OBJECTS OF INVENTION

In view of the above, it is an object of the present invention to provide a drop-lock adjusting means that is shielded against inadvertent animal manipulation.

Another object of the present invention is to provide, on automatic feeder devices, a shielded drop-lock adjustment means for preventing inadvertent animal manipulation while at the same time allowing for easy human manipulation.

Another object of the present invention is to provide, in a hog feeder system, an improved, shielded drop-lock adjustment means for the feeder gates provided in association thereto.

Another object of the present invention is to provide a shielded, drop-lock adjustment means including transverse slots for shielding the cranks when in their inverted position.

Another object of the present invention is to provide a shielded drop-lock adjustment means having transverse slots for receiving an inverted crank handle with its associated adjustment rod being off center relative to said slots.

Another object of the present invention is to provide a shielded, drop-lock adjustment means including longitudinal slots for receiving inverted crank arms.

Other objects and advantages of the present invention will become apparent and obvious from a study of the follow description and the accompanying drawings which are merely illustrative of such invention.

BRIEF DESCRIPTION OF DRAWINGS

FIG. 1 is a partial cut away perspective view of a typical feeder utilizing the prior art drop-lock crank means in association with transverse supporting channel members;

FIG. 2 is a sectional view taken through lines 2—2 of prior art FIG. 1;

FIG. 3 is a sectional view taken through lines 3—3 of prior art FIG. 1;

DETAILED DESCRIPTION OF INVENTION

Figure 4:
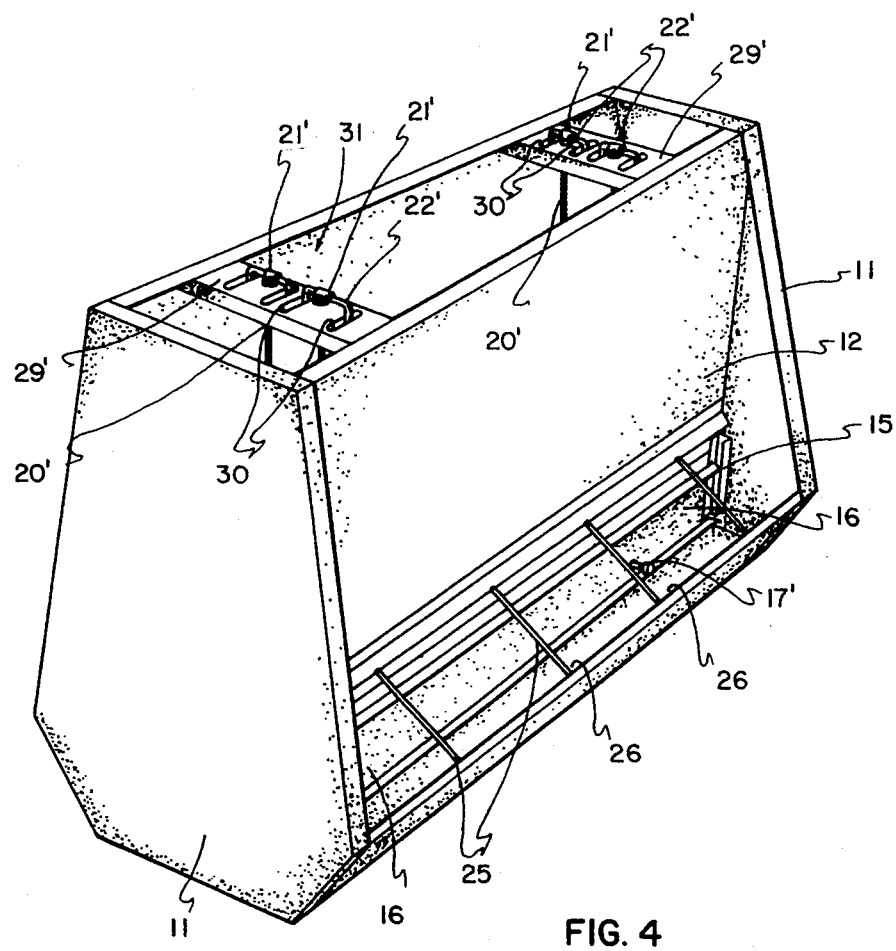
FIG. 4 is a perspective view of a feeder incorporating the shielded drop-lock adjustment means of the present invention.

A typical feeder device in conjunction with which the present invention can be used is indicated generally at 10 and includes a pair of parallelly spaced end walls 11 and a pair of inwardly sloping side walls 12. These end and side walls, in combination with inverted V-shaped-in-cross-section bottom 13, define an open top feed hopper 14.

A feed gate channel member 15 is provided on the interior of each of the end walls 11 and generally parallel to the slope of side walls 12. A feed gate 16 is slidingly mounted between paired channels 15 on opposite end walls. This can be seen in the cut away portion of FIG. 1 as well as in FIG. 2. The feed gates can be slidingly moved up and down within the channels 15.

A plurality of L-shaped adjusting rods 17 are provided with the lower end passing through an opening in the feed gate and terminating in a bulbous portion 18 to prevent the rod from becoming disengaged from such feed gate.

The upper end of each of the adjusting rods 17 has secured thereto, by weldment or other means, a threaded sleeve 19 which is adapted to receive threaded rod 20. The upper end of each of these last mentioned rods is fixedly secured to a T-fitting 21 with a generally horizontally disposed bore. Manipulating handle/lock 22 is pivotedly and slidively mounted within the bore of T-fitting 21.

Bottom 23 and sides 24, along with the lower portions of end walls 11 and feed gates 16, define feed troughs which, through the use of feed trough rods 25, define a plurality of feed positions 26.

When the U-shaped handle/locks 22 are turned to the upright position, indicated generally at 27, they can be manipulated as handles to turn the threaded rod 20 which, through its cooperation with threaded sleeve 19, moves adjusting rod 17 up or down. This moves feed gate 16 up or down to allow more or less feed to pass from the hopper, under the gate and into the feed positions 26.

Whenever the proper gate adjustment is achieved, the U-shaped member is inverted with the ends thereof being disposed on opposite sides of rod supporting cross channels 28 thus effectively locking such U-shaped member and preventing the same from being turned. This locked position is indicated generally at 28.

As discussed above, the problem with the U-shaped handle 22 being in the locked position is that certain animals, particularly smarter animals such as hogs, can climb up on the feeder and nudge the inverted handle upwardly to at least a horizontal position. Here it becomes unlocked from the cross channel 29 and can be turned in one direction or the other to either raise or lower the end of the feed gate 16 associated with that particular handle. This is not an isolated problem but a continuing problem that either wastes food or prevents the animals from receiving adequate food until the problem is recognized and rectified. This checking on gate positions is time consuming and labor intensive which defeats the purpose of the automatic feeder with adjustable gates.

Figure 5:
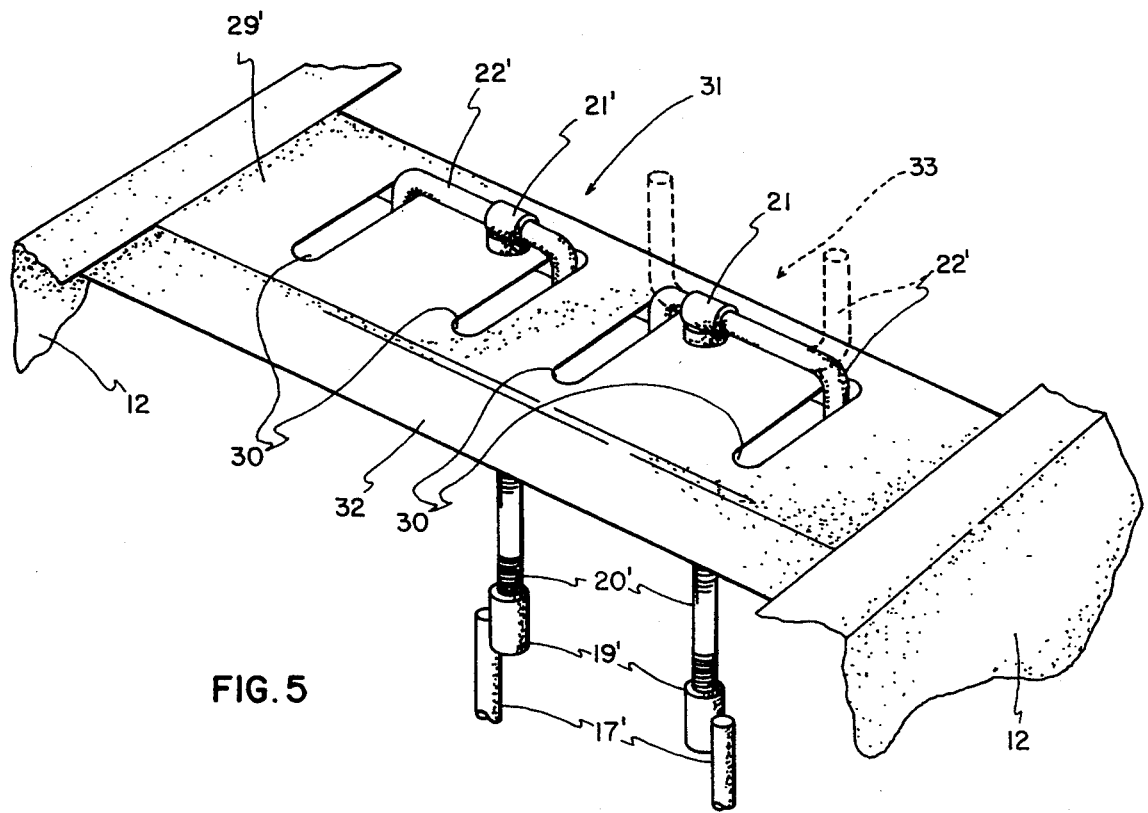
FIG. 5 is an enlarged fragmentary view of one of the channel members of FIG. 4 showing details thereof.

The present invention, shown in FIGS. 4 and 5 have modified adjustment rod supporting cross channels 29' with the T-fittings 21' and this associated threaded rods 20' passing therethrough adjacent one side rather than through the center of such channel. Also a pair of elongated, transverse openings 30 are provided adjacent each of the U-shaped handles 22'.

It has been found that having the T-fitting 21' located not only adjacent one edge of cross channel 29', but also closer to one of the elongated transverse openings than the other, will give a better holding lock when in the position indicated generally at 31.

It is, of course, anticipated that either the cross channels 29' could be made wider or the U-shaped handles 22' narrower to allow elongated longitudinal openings to be used.

The threaded rods 20' and their associated threaded sleeves 19' and adjusting rods 17' all function in the same manner as described for the prior art device shown in FIG. 1.

When the U-shaped handles 22 are in the locked position shown generally at 31, no animal can nudge the same into the horizontal or unlocked position since there are no exposed end portions to engage as was the case in the prior art disclosure. Not only are the handles when in the locked position extended downwardly through the elongated transverse openings 30, but they are also shielded by the downwardly projecting flanges 32 of their respective cross channel 29'.

A person on the other hand can readily grasp the handle 22 in the locked position 31 and rotate the same to the unlocked position 33 so that manipulation of such handle will raise or lower the associated feed gate as desired.

Figure 6:
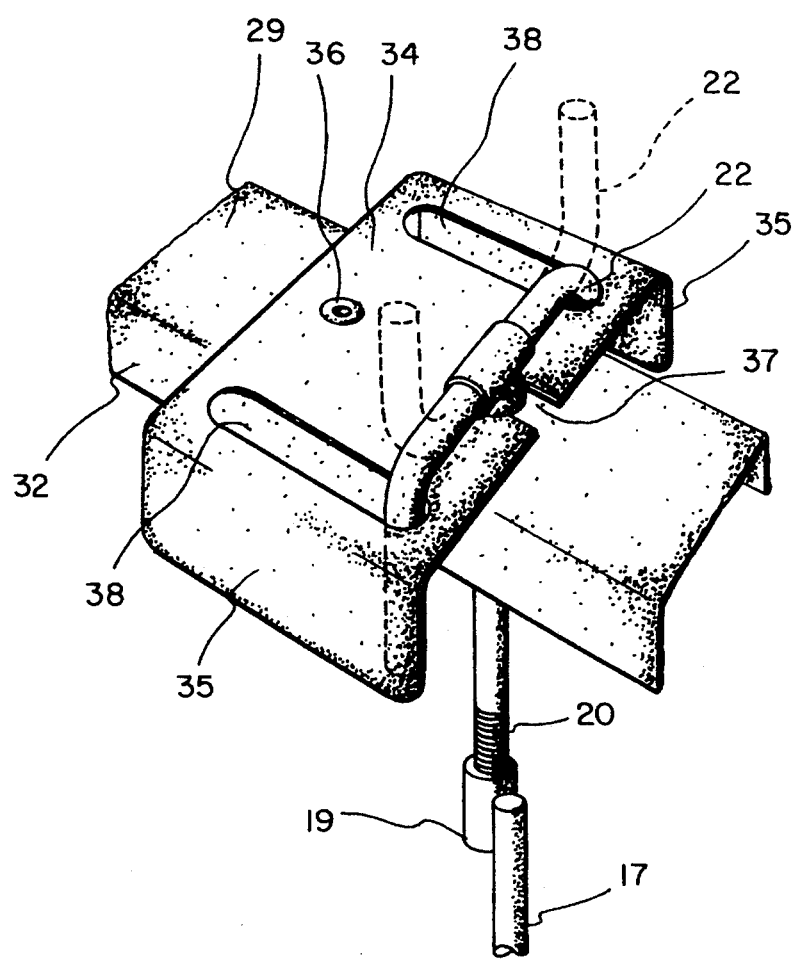
FIG. 6 is a perspective view of a modification of the present invention.

In the modification shown in FIG. 6 for retrofitting prior art feeders of the type shown in FIGS. 1 through 3, an adaptor plate 34 with downwardly projecting flanges 35 on either end thereof is secured to cross channel 29 with the associated threaded rod 20 passing through U-shaped opening 36. A rivet or similar fastening means 37 passes through adaptor plate 34 adjacent the edge of such plate opposite opening 36 to firmly secure said plate to its associated channel 29.

A pair of elongated slots 38 are provided in adaptor plate 34 and are disposed parallel to the sides of cross channel 29 as can clearly be seen in FIG. 6. This allows the normal U-shape handles 22 of the prior art feeder to be placed in the down position shown in the partial cutaway side elevational view of FIG. 3.

When in the position described above, no animal can nudge the handles 22 into the horizontal or unlock position since there are no exposed end portions to engage as was the case prior to the flanged adaptor modification being added.

From the above it can be seen that the present invention provides a superior handle locking means which engages adjacent elongated slots and is shielded from animal nudging and possible unlocking by the downwardly projecting flanges of its associated cross channel.

The terms "upright", "inverted", "sides", "ends" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A shielded drop-lock adjusting means comprising: a support channel; at least one control rod means passing through at least one opening in said channel; a handle means pivotally mounted on one end of said control rod means and having at least one angularly disposed end; and an adaptor plate mounted on said channel and having at least one flange downwardly projecting therefrom in spaced relation to a side of said channel, said plate including an elongated slot running parallel to the space between the at least one adaptor flange and the channel side whereby when the at lest one angularly disposed end of said handle means is pivoted away from said support channel, such handle can be used to manipulate said control rod means and when said angularly disposed end is pivoted downwardly into engagement with said slot-like opening, such handle will be locked and cannot manipulate said control rod means.

2. The adjusting means of claim 1 wherein said handle means is angled at both ends; and a pair of slot-like openings are provided in said adaptor plate on opposite sides of said channel whereby said angled ends will engage said slot-like openings to lock said handle in place.

3. The adjusting means of claim 1 wherein a fastening means is used to fixedly secure said adaptor plate to said channel.

4. The adjusting means of claim 3 wherein said securing means is at least one rivet-type fastener.

* * * * *